April 8, 1947. R. P. PECKHAM, JR 2,418,790
CUTTING TOOL
Filed May 15, 1944 2 Sheets-Sheet 1
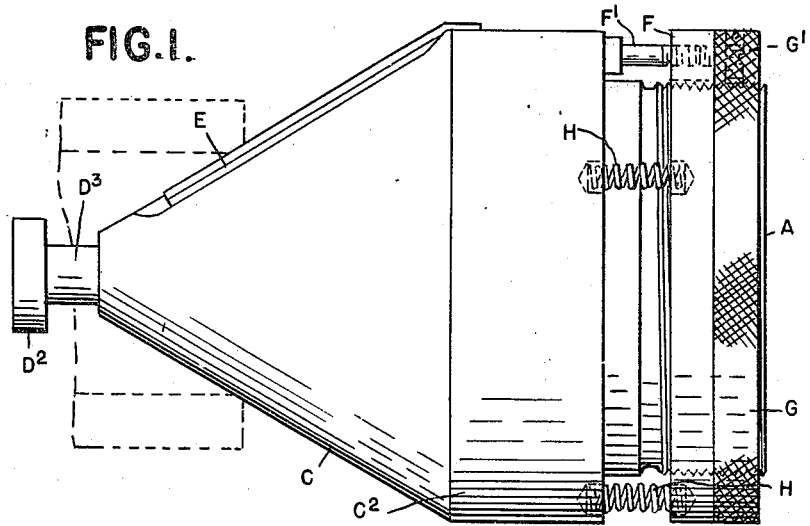
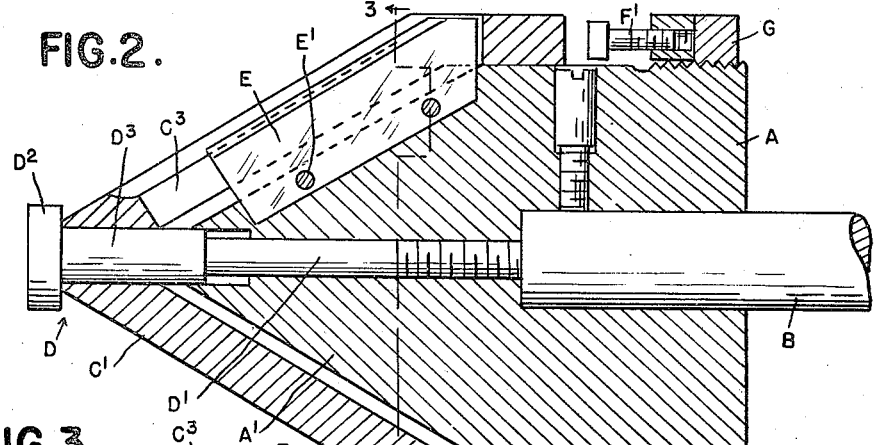
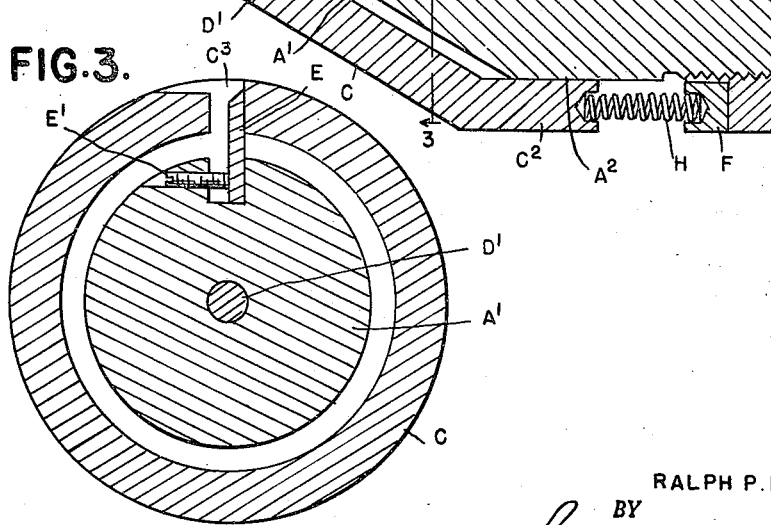
*INVENTOR.*
RALPH P. PECKHAM JR
BY
*Whittemore, Hulbert & Belknap*
ATTORNEYS

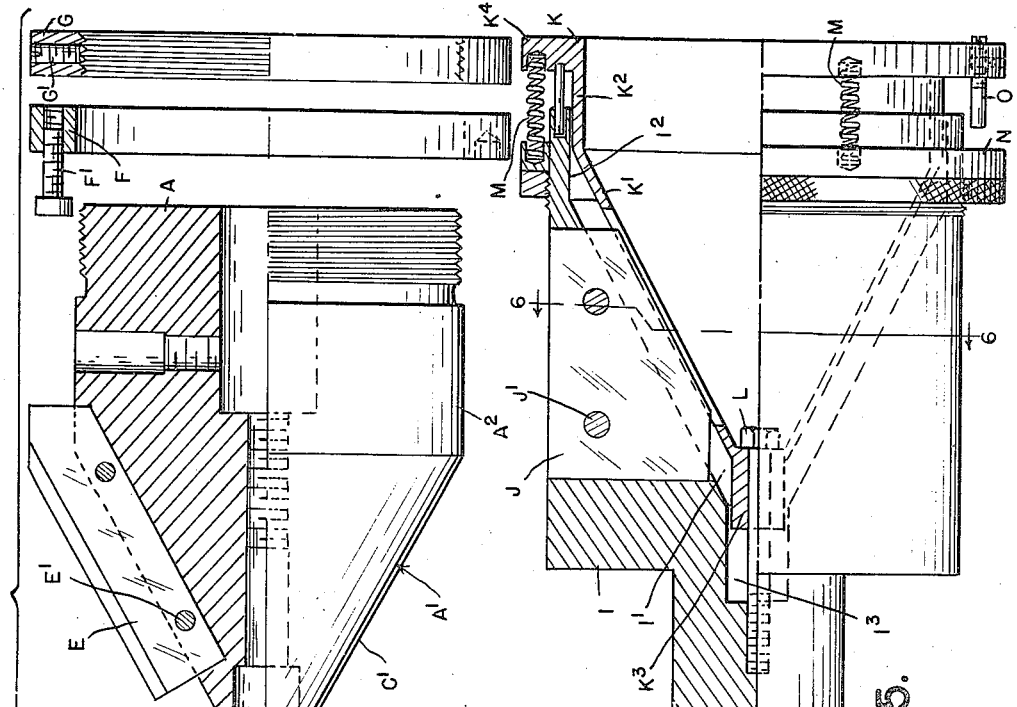
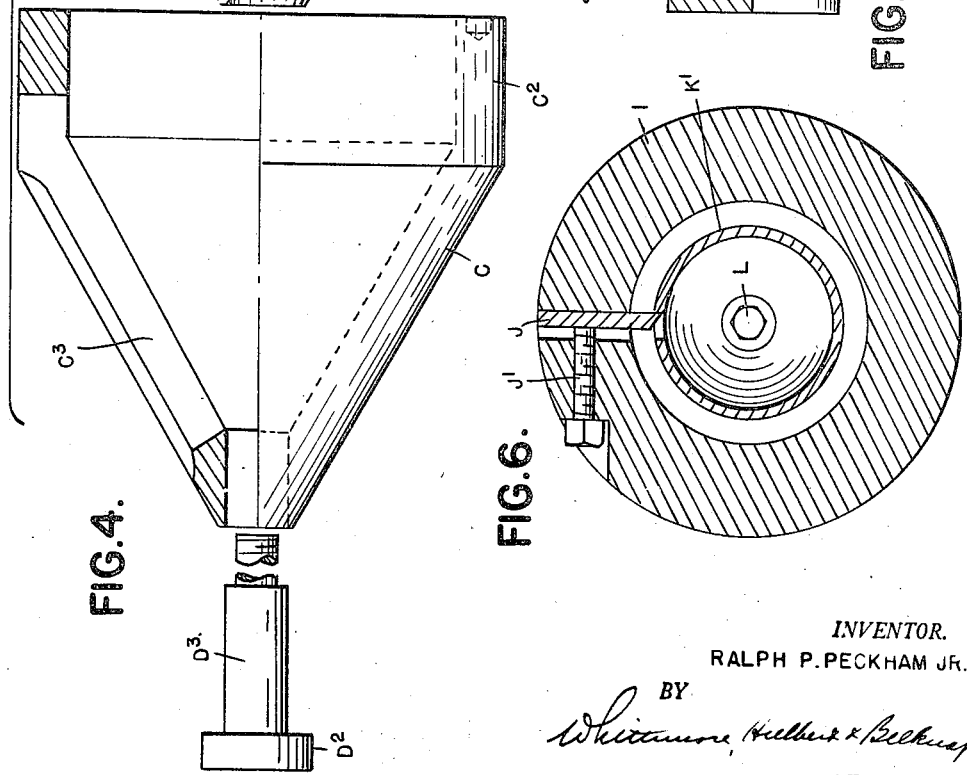

Patented Apr. 8, 1947

2,418,790

UNITED STATES PATENT OFFICE 2,418,790

CUTTING TOOL

Ralph P. Peckham, Jr., Detroit, Mich.

Application May 15, 1944, Serial No. 535,701

5 Claims. (Cl. 77—73.5)

The invention relates to cutting tools and has for its object the obtaining of a construction suitable for various operations including deburring, countersinking, chamfering, etc.

It is a further object of the invention to obtain a construction in which the cutting edge is normally sheathed and is only projected during the performance of the work.

It is also an object to provide means for guiding and centering the tool in relation to the work prior to and during the projection of the cutting edge. With these and other advantageous feaures in mind, the invention consists in the construction as hereinafter set forth.

In the drawings:

Fig. 1 is a side elevation of my improved cutting tool;

Fig. 2 is a central longitudinal section thereof;

Fig. 3 is a cross section on line 3—3, Fig. 2;

Fig. 4 is an elevation partly in section showing the various elements of the tool detached;

Fig. 5 is a sectional side elevation showing a modified construction; and

Fig. 6 is a cross section on line 6—6, Fig. 5.

As shown in Figs. 1 to 4, my tool comprises a member A adapted for mounting on a rotary spindle, such as B, said member being formed with a conical outer end portion A'. C is a hollow shield member having a conical portion C' corresponding to the portion A' and a cylindrical portion $C^2$ for slidably fitting over a cylindrical portion $A^2$ of the member A. D is a guide member including a bolt D' engaging a central threaded aperture in the member A to project outward from the nose portion thereof. The outer end of the bolt has a head $D^2$ and a sleeve $D^3$ surrounding the bolt adjacent to the head $D^2$ extends into a counterbore in the member A. The sleeve $D^3$ slidably fits an aperture in the nose portion of the shield C and the arrangement is such that the shield is longitudinally movable for a limited distance upon the guide D and cylindrical portion $A^2$ of the member A. Mounted on the conical portion A' of the member A to extend radially outward therefrom is a cutter blade E. The shank portion of this blade is secured within a slot in the member A by suitable means, such as bolts or screws E', so as to hold the outer cutting edge of the blade parallel to the angle of the cone. The shield member C is provided with a slot $C^3$ into which the blade E extends and, when the shield is moved rearward, this cutting edge projects outward beyond the conical surface thereof. However, when the shield is moved forward into contact with the head $D^2$ of the bolt, the cutting blade will be completely sheathed within the shield C. F is a collar sleeved upon the cylindrical portion of the member A and G is an internally threaded collar engaging a correspondingly threaded portion of the member A. Between the collars F and shield C are springs H, one end of which engages a recess in the collar F while the opposite end abuts against the shield. Thus, by adjusting the collar G on the member A the springs may be preloaded to any degree desired. A set screw G' in the collar G serves to lock said collar in any position of adjustment.

With the construction as above described, the tool may be employed either for removing a burr from a bored aperture or for chamfering or countersinking said bore. In performing this operation the conical shield, first, engages the bore to center the work with the axis of the spindle B, the blade E being completely withdrawn within the shield. When pressure is applied, the shield will move rearward against the resilient pressure of the springs H until the cutting edge of the blade E projects. The greater the pressure, the farther the blade will project but the distance is limited by contact of the nose of the shield with a stop screw F' threadedly engaged with the collar F to extend between this collar and the shield C. Thus, by adjusting the screw the clearance between the head thereof and the shield C may be changed. Also, by changing the loading of the springs H, the amount of pressure required to project the blade is correspondingly changed.

With the modified construction shown in Figs. 5 and 6, the tool is designed to remove a burr from the outside of a member or to chamfer such member. In this construction a member I adapted to be driven by a rotary spindle or chuck is provided with a conical recess I'. The cutting blade J is mounted in a slot in the member I by suitable means, such as the clamping bolts J', with its cutting edge projecting radially inward and parallel to the angle of the cone. A shield K has a conical portion K' which is slotted to receive the projecting portion of the blade J. This shield is guided by a cylindrical portion $K^2$ slidable within a cylindrical portion $I^2$ of the member I, while the nose portion of the shield has a cylindrical portion $K^3$ engaging a cylindrical recess $I^3$ in the member I. A headed bolt L limits the outward movement of the shield and springs M arranged between a flange $K^4$ and an adjustable collar N resiliently press the shield to its outer position. An adjustable stop screw O in the flange K⁴ limits the amount of inward movement and a pin P on the flange K⁴ engaging an aperture in the member I serves to drive the one from the other.

In the operation of this modified construction, the end of a bolt or pin may be chamfered by, first, contacting it with the inner surface of the shield and then moving inward against the tension of the springs M until the blade is projecting to effect the cutting. The tool may also be used for removing an external burr from any member which may be inserted within the conical shield.

What I claim as my invention is:

1. A cutting tool of the class described comprising a member having a conical portion concentric with the axis of said member, a blade mounted in said member to have its cutting edge portion parallel to the angle of the cone and projecting beyond the surface thereof, a shield having a conical portion parallel to the conical portion of said member with a slot therethrough into which said blade extends, means for guiding said shield for axial movement relative to said member in concentric relation thereto, resilient means for normally holding said shield in an axial position where the cutting edge of the blade is sheathed within the slot but permitting movement when the work is pressed against the shield to project said cutting edge into operative engagement therewith, and adjustable means for limiting the axial movement of said shield and the distance of projection of said cutting edge.

2. A cutting tool of the class described comprising a member having a male conical portion concentric with the axis of said member, a blade mounted on said member to project outward therefrom with its cutting edge parallel to the angle of the cone, a female conical shield axially slidable on said male member and having a slot into which said blade extends, resilient means for normally holding said shield in a position where the cutting edge of the blade is sheathed within said slot, and stops for limiting axial movement of said shield whereby the pressing of said tool against the work will first engage said shield therewith to center the same and upon further pressure will project said blade into cutting engagement.

3. A cutting tool of the class described comprising a member having a conical portion concentric with the axis of said member and a cylindrical portion, a cutting blade mounted on the conical portion to project therefrom with its cutting edge parallel to the angle of the cone, a cylindrical guide projecting from the nose of the cone, a conical shield slidable on said guide and having a cylindrical portion slidable on the cylindrical portion of said member, said shield having a slot therein into which said blade extends, a collar adjustably mounted on the cylindrical portion of said member, resilient means between said collar and shield for normally moving the latter into a position where the cutting edge of the blade is sheathed within said slot, and an adjustable stop for limiting the movement of said shield and the distance the cutting edge of the blade is projected beyond the same.

4. A cutting tool of the class described comprising a member having a conical portion concentric with the axis of said member, a cylindrical portion at the large end of the cone and a cylindrical recess in the nose of the cone, a headed guide member engaging said recess to project outward therefrom and also having a threaded engagement with said member, a blade mounted on the conical portion of said member to project outward therefrom with its cutting edge parallel to the angle of the cone, a conical shield having the same angle, the nose portion of said shield being apertured to slightly engage said guide, said shield also having a cylindrical portion slidably engaging said member and being slotted in the conical portion to receive the projecting portion of said blade, a collar having a threaded engagement with the cylindrical portion of said member, resilient means between said collar and the cylindrical portion of said sleeve, and a stop adjustably engaging said collar and limiting the movement of said shield.

5. A cutting tool of the class described comprising a member having a conical recess therein concentric with the axis of said member, a blade mounted on said member to project into said conical recess with its cutting edge parallel to the angle of the cone, a conical shield having a slot therein for receiving said blade, means for guiding said shield to be movable axially of said member in concentric relation thereto, stops for limiting the axial movement of said shield, and resilient means for normally holding said shield in a position where the cutting edge of the blade is sheathed within said slot but permitting axial movement by pressure of work inserted within and against said shield to project said cutting blade into operative engagement with the work.

RALPH P. PECKHAM, Jr.

REFERENCES CITED

The following references are of record in the file of this patent:

UNITED STATES PATENTS

| Number | Name | Date |
| --- | --- | --- |
| 2,187,221 | Brown | Jan. 16, 1940 |
| 1,346,105 | Bosse | July 13, 1920 |
| 1,377,495 | Logan | May 10, 1921 |
| 1,058,149 | Campbell | Apr. 8, 1913 |

FOREIGN PATENTS

| Number | Country | Date |
| --- | --- | --- |
| 240,420 | German | Nov. 3, 1911 |